United States Patent
Walters et al.

(10) Patent No.: US 8,321,943 B1
(45) Date of Patent: Nov. 27, 2012

(54) PROGRAMMATIC COMMUNICATION IN THE EVENT OF HOST MALWARE INFECTION

(75) Inventors: Robert Walters, Southern Shores, NC (US); Adam Schepis, Milford, MA (US); Javier Santoyo, Santa Monica, CA (US)

(73) Assignee: Symantec Corporation, Cupertino, CA (US)

( * ) Notice: Subject to any disclaimer, the term of this patent is extended or adjusted under 35 U.S.C. 154(b) by 674 days.

(21) Appl. No.: 12/512,906

(22) Filed: Jul. 30, 2009

(51) Int. Cl.
*G06F 11/00* (2006.01)
*G06F 12/14* (2006.01)
*G06F 12/16* (2006.01)
*G08B 23/00* (2006.01)

(52) U.S. Cl. .................... 726/24; 726/22; 726/23
(58) Field of Classification Search ............. 726/22–25
See application file for complete search history.

(56) References Cited

U.S. PATENT DOCUMENTS

| 6,463,533 | B1* | 10/2002 | Calamera et al. | 713/163 |
| 6,857,009 | B1* | 2/2005 | Ferreria et al. | 709/219 |
| 7,496,960 | B1* | 2/2009 | Chen et al. | 726/22 |
| 7,577,993 | B2* | 8/2009 | Roychowdhary et al. | 726/22 |
| 7,814,550 | B2* | 10/2010 | Ellis | 726/25 |
| 2005/0131997 | A1* | 6/2005 | Lewis et al. | 709/203 |
| 2006/0198514 | A1* | 9/2006 | Lyseggen et al. | 380/28 |
| 2007/0260738 | A1* | 11/2007 | Palekar et al. | 709/229 |

* cited by examiner

*Primary Examiner* — Eleni Shiferaw
*Assistant Examiner* — Jing Sims
(74) *Attorney, Agent, or Firm* — Fenwick & West LLP (57) ABSTRACT

A distress signal sender and a distress signal receiver receive beacon-name generation parameters and generate a beacon name based at least in part on the received parameters, the beacon name representing a network location. Responsive to detecting an unexpected lack of access to network communications, the distress signal sender sends a beacon message to the generated beacon name, the beacon message describing a security state of the client. The distress signal receiver detects the beacon message sent by the distress signal sender, and responsive to receiving the beacon message, performs a remedial action.

17 Claims, 6 Drawing Sheets

PROGRAMMATIC COMMUNICATION IN THE EVENT OF HOST MALWARE INFECTION

BACKGROUND OF THE INVENTION

1. Field of the Invention

This invention pertains in general to computer security, and more specifically, to identifying infected machines in the presence of communications-blocking malware.

2. Description of Related Art

Modern computer systems are often susceptible to a number of different problems, problems which are exacerbated by the increasing complexity of such systems. One such problem relates to system security. There exists a wide variety of security threats posed by malicious software such as viruses, worms, Trojan horses, and the like—collectively referred to as "malware"—that secretly performs operations not desired by the computer user. Such operations include theft of important data (e.g. financial records), modification or destruction of system or user files, execution of "backdoor" programs, and the like. The automated identification of host systems infected by malware is desirable, and this is particularly so for enterprises having a large number of computer systems, for which manual examination of every system is infeasible. Such automated identification typically relies on an infected host to recognize its infection and to report the infection to some other system, such as a security server, Administrator Console, or the like, from which some form of aid can be expected.

However, one possible action of malware is to interrupt communications from an infected host system to other systems, such as those having uniform resource locators (URLs) or internet protocol (IP) addresses on a list of common anti-malware security providers. Thus, without the ability of the host to advertise the fact that it is infected with malware, it becomes considerably more difficult to identify hosts requiring attention.

SUMMARY

The difficulties described above are addressed by a computer-implemented method, computer readable medium, and computer-implemented device that employ beacon names— e.g., URLs or IP addresses, chosen to represent non-typical network destinations—as the destination addresses when sending messages within an enterprise network, thereby thwarting malware expecting the use of well-known addresses. Parameters are distributed by a security server to sending components located on client devices and to receiving components located elsewhere within the enterprise, and the beacon names are generated based at least in part on the distributed parameters. In one embodiment, the sending and receiving components synchronously generate additional beacon names at well-defined intervals, without requiring redistribution of parameters by the security server. In another embodiment, a sending component sends a distress signal message (or "beacon") in response to unexpected lack of client device access to network resources, and a receiving component upon detecting the beacon takes a remedial action to address possible presence of malware on the client device. In still another embodiment, the sending component sends a message periodically while the client device continues to have expected network access, and the receiving component takes a remedial action in response to failure to receive a message from the client device for a given period of time.

One embodiment of the computer-implemented method receives, at a client, beacon name-generation parameters, and generates a beacon name based at least in part on the received parameters, the beacon name representing a network location. The method additionally stores the beacon name, and sends a beacon message to the beacon name, the beacon message describing a security state of the client.

Embodiments of the computer-readable storage medium store a computer program executable by a processor for responding to a client indication of malware infection. Actions of the computer program comprise receiving beacon name-generation parameters, and generating a beacon name based at least in part on the received parameters, the beacon name representing a network location. The actions further comprise detecting a beacon message sent by a client device and addressed to the beacon name, the beacon message describing a security state of the client device, and, responsive to receiving the beacon message, performing a remedial action.

A computer-implemented system for responding to a client indication of malware infection comprises a beacon name information repository and a distress signal receiver module. The distress signal receiver module performs actions comprising receiving beacon name-generation parameters, and generating a beacon name based at least in part on the received parameters, the beacon name representing a network location. The actions further comprise storing the received parameters and the generated beacon name in the beacon name information repository, and detecting a beacon message sent by a client device and addressed to the beacon name, the beacon message describing a security state of the client device. The actions further comprise, responsive to receiving the beacon message, performing a remedial action.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
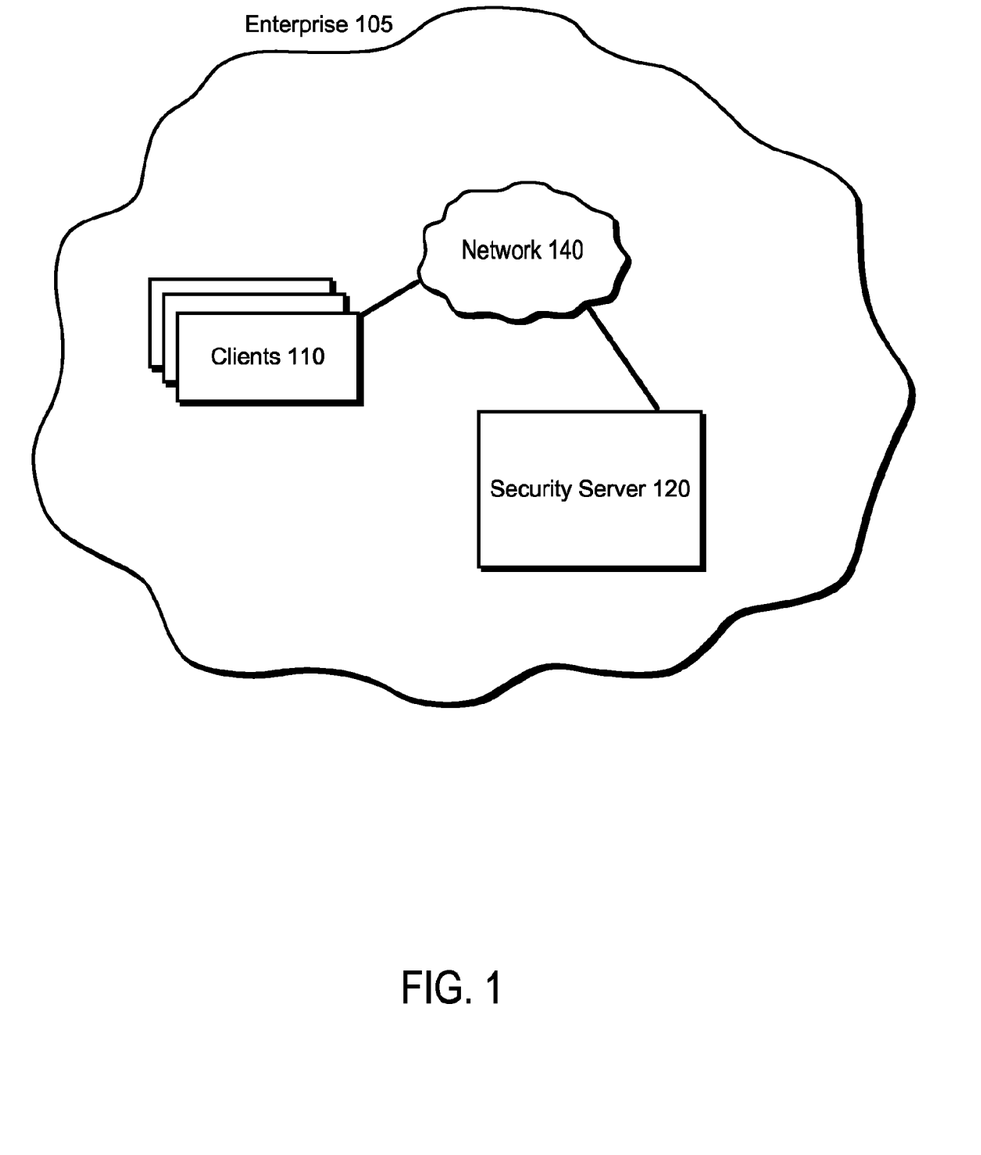
FIG. 1 is a high-level block diagram of an enterprise permitting communication in the presence of communication-blocking malware, in accordance with one embodiment of the present invention.

FIG. 1 is a block diagram of an enterprise permitting communication in the presence of communication-blocking malware, in accordance with one embodiment of the present invention. Enterprise 105 encompasses the computer systems under the control of a particular organization, such as a corporation, a school, a governmental body, and the like. In particular, the enterprise 105 of FIG. 1 comprises one or more clients 110 and a security server 120, communicatively coupled by a network 140. The enterprise 105 can have thousands or millions of clients 110 and security servers 120.

A client 110 receives security services, such as malware security updates for its anti-malware software, from the security server 120. The security server 120 is depicted in FIG. 1 as being located within the enterprise, but in some embodiments the security server is located outside of the enterprise and administered by an organization other than that administering the enterprise 105. The client 110 may be infected by malware that blocks communications of the client with some or all other devices. Typically, the malware blocks only communications with security servers whose names, such as hostnames, uniform resource locators (URLs) or internet protocol (IP) addresses, are on a list of known security providers. This selective blocking allows the malware to conceal its presence more effectively, since blocking all communications would alert users that something was amiss and prompt them to investigate. The client 110 communicates with the security server 120 over the network 140 via a beacon name—e.g., a URL or IP address—agreed upon by the client and the server. The beacon name is selected so as not to appear on a list of known names of security providers, thus preventing any malware that might be present on the client 110 from blocking the communications from the client to the beacon name. In one embodiment, this is accomplished by generating the beacon name using a pseudo-random algorithm. The beacon name represents a network location in that it acts as a destination address for network communications, although a given beacon name would likely not be considered a valid destination on a conventional network, particularly in embodiments in which the beacon name is generated according to a pseudo-random algorithm. The client 110 and security server 120 are described in more detail, below, in association with FIGS. 3 and 4, respectively.

The network 140 represents the communication pathways between the clients 110 and the security server 120. In one embodiment, the clients 110 and the security server 120 are located completely within the enterprise 105; in other embodiments, some components, such as components used by the security server 120, are located outside the enterprise 105 but accessed as services via the network 140. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
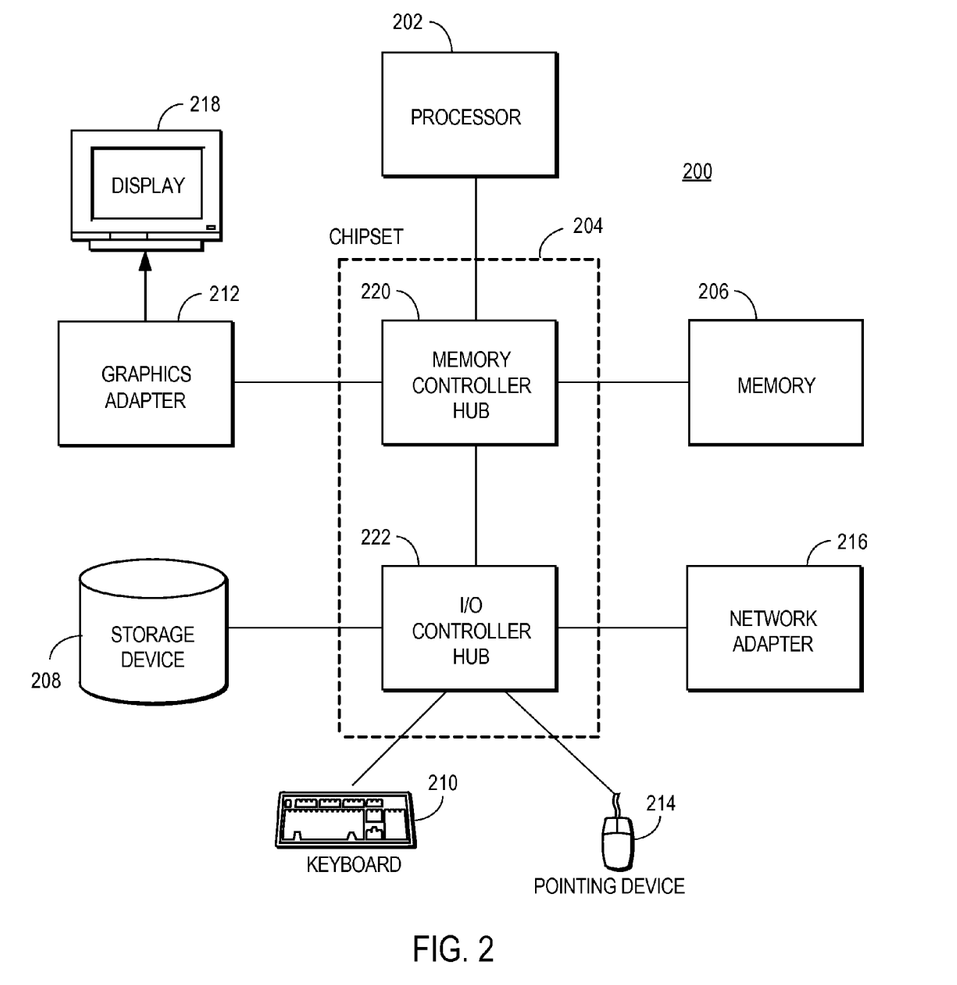
FIG. 2 is a high-level block diagram illustrating physical components of a computer within the enterprise, in accordance with one embodiment.

FIG. 2 is a high-level block diagram illustrating physical components of a computer, such as a client 110 or security server 120, within the enterprise 105 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
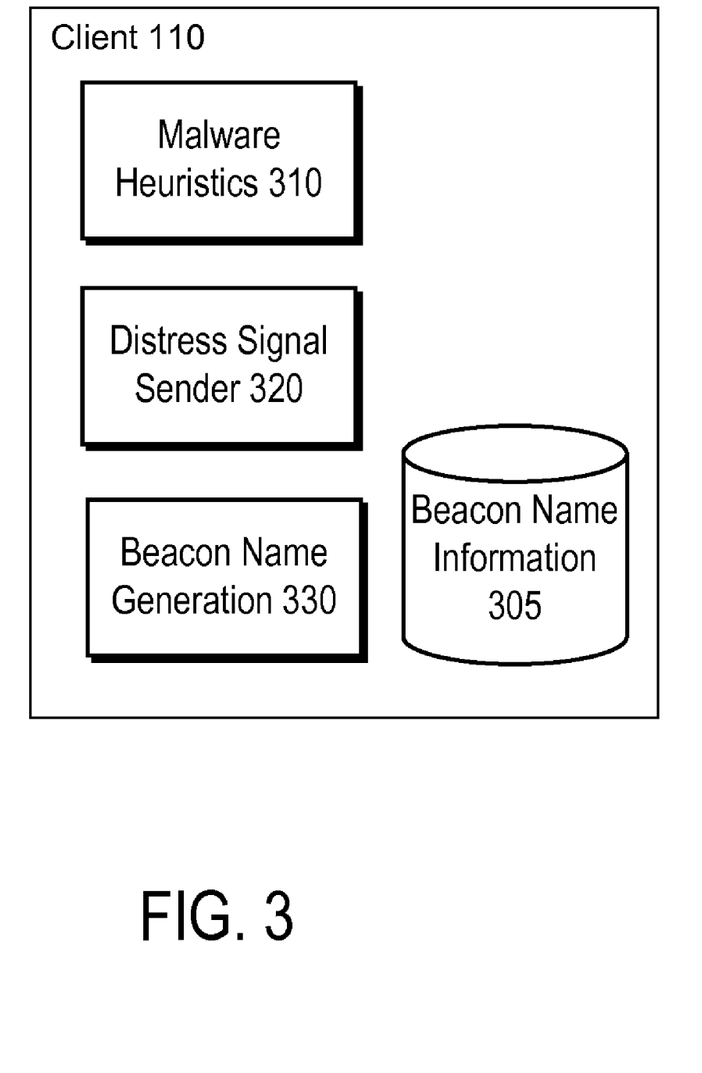
FIG. 3 is a high-level block diagram illustrating a detailed view of a client of FIG. 1, in accordance with one embodiment.

FIG. 3 is a high-level block diagram illustrating a detailed view of a client 110 of FIG. 1, in accordance with one embodiment. The client 110 is a computer, such as a personal computer, laptop computer, digital assistant, personal digital assistant, cellular phone, mobile phone, or smart phone, or more generally any device connected to the network 140 that may become infected by malware and on which security software can be installed. The client 110 comprises a malware heuristics module 310 for detecting an unexpected lack of access to network resources, and a distress signal sender module 320 for sending a distress signal message to other components within the enterprise 105. The client 110 also comprises a beacon name information repository 305 for storing parameters distributed by the server 120 for generating a beacon name, and further for storing the beacon name once it is generated by a beacon name generation module 330 (described further below with respect to FIG. 5). The information repository may store only the most recently-generated beacon name, or it may store some or all of the previously-generated beacon names, along with their times of generation. Further details regarding the distributed parameters and generated beacon names are provided below with respect to FIGS. 4 and 5.

The malware heuristics module 310 detects a lack of access to network resources, such as communications capabilities, in situations where such access should normally be permitted. For example, a laptop that is attached to a network belonging to the enterprise 105 would typically have the ability to form TCP connections with other machines within that network, such as a known security server, and the absence of such ability would indicate an anomalous situation potentially caused by malware. Another example of an unexpected lack of access to network communications is the inability to access a particular predetermined network address, such as the address of a security server, while still being able to access other network addresses, which could indicate that malware is selectively blocking access to security services. Thus, the malware heuristics module 310 both identifies the resources to which it should have access in its current state, and further determines whether it does in fact have such access.

The distress signal sender module 320 sends a distress signal message, hereinafter referred to as a "beacon" or "beacon message," destined for a distress signal receiver module. The distress signal sender module 320 sends the beacon to an address given by the beacon name agreed upon by the distress signal sender and the distress signal receiver, as discussed below with reference to FIG. 4. The sending of the beacon is triggered by, for example, a determination by the malware heuristics module that the client 110 lacks access to resources to which it is expected to have access. The beacon describes a security state of the client 110, either explicitly, within the beacon message data itself, or implicitly, by receipt of the beacon. For example, in one embodiment the receipt of the beacon implicitly indicates that malware has been detected on the client 110; in another embodiment, it implicitly indicates that the client continues to be malware-free. The beacon includes at least an identity of the client 110, as indicated by some identifier such as an IP address, a machine name, a MAC address of a network card, an indicator of a particular physical location (e.g., stored in an RFID tag), or the like. The identity may be located in a header of a packet inclosing the beacon, or within the body of the beacon itself. The beacon may additional information in different embodiments. For example, in one embodiment the information within the beacon may include only the identity of the sending client 110. In other embodiments, the beacon includes additional information such as recent network connections used by the client 110, URLs recently navigated to on the client, client devices recently detected via Plug & Play, or client devices recently used by AutoRun, such information providing additional aid in identifying the exact client 110 that sent the beacon (and thus is presumably infected by malware), as well as potentially helping to describe how the malware behaves.

Figure 4:
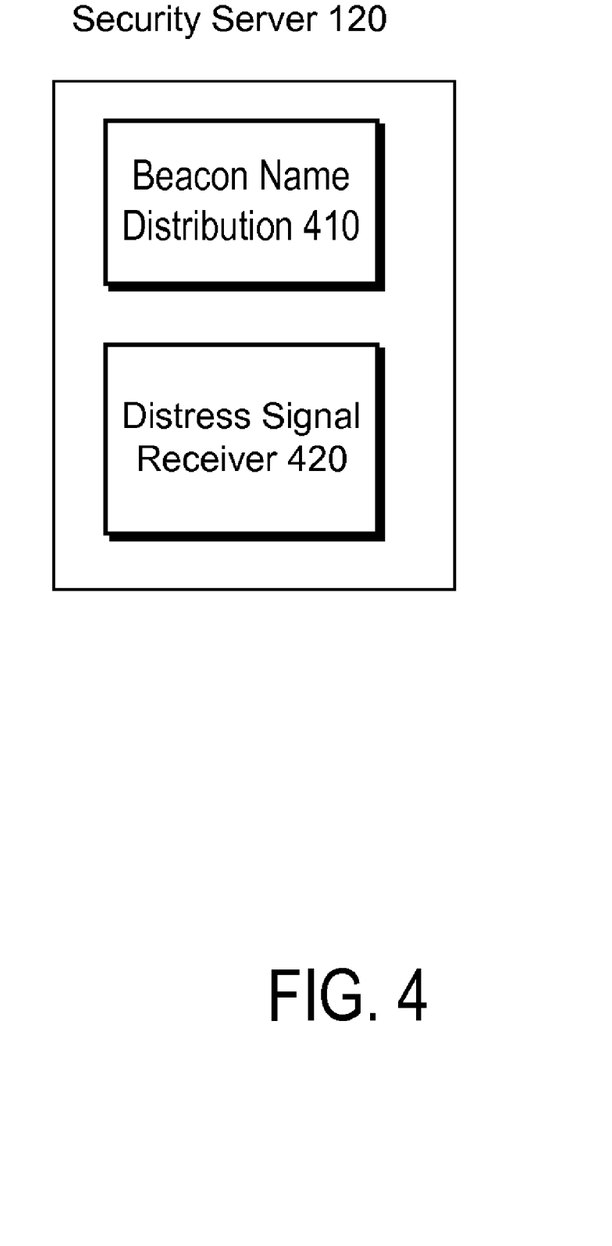
FIG. 4 is a high-level block diagram illustrating a detailed view of the security server of FIG. 1, in accordance with one embodiment.

FIG. 4 is a high-level block diagram illustrating a detailed view of the security server 120 of FIG. 1, in accordance with one embodiment. The security server 120 comprises a beacon name distribution module 410 and—in some embodiments—a distress signal receiver 420.

The beacon name distribution module 410 distributes, to each distress signal sender 320 of the clients 110, and to each distress signal receiver 420 (which may be located on the security server 120, or elsewhere), the appropriate parameters needed by the beacon name generation module 540 to generate the beacon names. Distribution can be done in a number of different ways in different embodiments. For example, in one embodiment each distress signal sender 320 and receiver 420 contacts the beacon name distribution module 410, e.g. directly after they are installed—at which point it is expected that there has not yet been a malware infection—to obtain the parameters. The senders 320 and receivers 420 may contact the beacon name distribution module 410 at different times, and it will provide each with the parameters necessary to obtain synchronization, based on the time of the contact. The parameters are then stored by the clients 110 and the distress signal receivers 420 in the beacon name information repositories 305, 505. Redistribution of parameters need not be performed unless an error causes the senders 320 and receivers 420 to lose synchronization. In one embodiment, the parameters include an initial seed value used by the beacon name generation module 540 to determine the beacon name, such as URL or IP address In another embodiment, the parameters include a set of literal beacon names, along with descriptions of a time interval during which each beacon name is applicable.

The use of beacon names agreed upon by the distress signal sender 320 and the distress signal receiver 420 makes it difficult for malware to anticipate the beacon names for which to block communications, and in one embodiment this difficulty is enhanced by generating new beacon names at the expiration of set intervals. For example, each distress signal sender 320 and receiver 420 could generate a new beacon name at the end of a set period of time, e.g., a particular 20 second period. It is appreciated that the intervals need not be defined by expirations of certain time periods, but more generally can be defined based on any conditions that may be independently evaluated by the various distress signal senders 320 and receivers 420. In some embodiments, the parameters include information in addition to the initial seed value, such as an identifier of the beacon name-generation algorithm being employed and a rule or condition for generating a new beacon name, such as a time period length (e.g., 20 seconds) after which the current beacon name expires.

The distress signal receiver 420 receives the beacon sent by the distress signal sender 320 and takes an appropriate action. The distress signal receiver 420 may be implemented in a number of different ways in different embodiments, and may be located on the security server 120, as depicted in FIG. 4, or outside of the server, as described further below with reference to FIG. 5.

Figure 5:
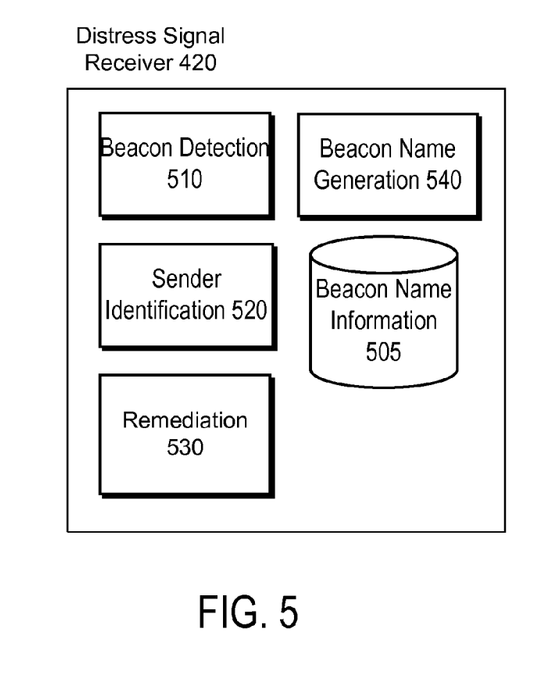
FIG. 5 is a high-level block diagram illustrating in more detail the distress signal receiver 420 of FIG. 4, in accordance with one embodiment.

FIG. 5 is a high-level block diagram illustrating in more detail the distress signal receiver 420 of FIG. 4, in accordance with one embodiment. The distress signal receiver 420, like the distress signal sender 320 of FIG. 3, comprises a beacon name information repository 505 for storing parameters distributed by the server 120 used to generate a beacon name and for further storing the generated beacon name.

The distress signal receiver 420 also comprises a beacon name generation module 540 that uses the same algorithm as the beacon name generation module 330 of the client 110. The beacon name generation module 540 generates a beacon name using the parameters provided by the beacon name distribution module 410 of the security server 120 of FIG. 4. In an embodiment in which the parameters comprise a seed value, the beacon name distribution module 540 generates the beacon name according to a pseudo-random algorithm that takes the seed value as input. In an embodiment in which literal beacon names and time intervals are provided, the beacon name generation module 540 simply stores the provided beacon names in the beacon name information repository 505 in association with their respective time intervals.

The distress signal receiver 420 further comprises a beacon detection module 510, which can be implemented in different ways in different embodiments, some of which may not be located on the security server 120, as noted above. In one embodiment, the distress signal receiver 420 is implemented as a plug-in module to a domain name system (DNS) server that receives a DNS request from the client 110 as part of sending the distress signal. The DNS server may be operated by the enterprise 105 itself, or by an ISP or other entity external to the enterprise. In this embodiment, the beacon detection module 510 observes a DNS request for the IP address corresponding to the beacon name URL stored in the beacon name information repository 505, an indication that the DNS request constitutes a distress signal beacon. In response to the DNS request, the beacon detection module 510 may additionally provide the distress signal sender 320 with the IP address of a security system not expected to be on a list of security servers blocked by malware, such as a security server local to the enterprise 105. The distress signal sender 320 may then exchange messages with the security server, e.g., to provide added information about the state of the client 110 in order to better diagnose the malware infection. In another embodiment, the beacon detection module 510 need not be a module of a DNS server, but rather may be located on any machine with permission to read the DNS server's failure log. In this embodiment, the beacon detection module 510 periodically—e.g., every 30 seconds—scans the DNS server's failure log to identify any recent failed DNS address resolution attempts. The beacon detection module 510 consults the beacon name information repository 505 to determine the beacon name in use at the time that a particular DNS address resolution failed. If this beacon name matches the beacon name associated with the failure in the DNS log, then the beacon detection module 510 determines that the DNS request constituted a distress signal beacon.

In another embodiment, the beacon detection module 510 is located on any machine capable of monitoring network traffic, such as a router or a switch. In this embodiment, the beacon detection module 510 examines each packet and determines whether it is destined for an IP address stored in the beacon name information repository 505 as the current beacon name. If so, it then determines that the packet is a distress signal beacon.

The distress signal receiver 420 further comprises a sender identification module 520, which determines the identity of the client 110 that sent the distress signal, based on the data of the beacon. Depending on the embodiment of the beacon detection module 510, the client identity may be determined from standard header information, e.g. the source IP address of a packet enclosing a DNS request, or the source IP address of a packet destined for a beacon IP address, or from DNS failure logs. Alternatively, in embodiments in which the beacon includes a client identifier, such as an IP address, MAC address, or machine name, in the body of the message, the sender identification module 520 can instead rely on this identifier. The distress signal receiver 420 further comprises a remediation module 530, which takes a remedial action in response to detection of a beacon by the beacon detection module 510. The action taken is different in different embodiments. For example, in one embodiment the remediation module 530 creates an entry in a local log, the entry including information such as the identity of the client 110 sending the beacon, the time of receipt of the beacon, and the like. In another embodiment, the remediation module sends a notification of the beacon to a management console process executing on the server 120 or on another system accessible to enterprise administrators. The management console then displays information on the beacon, such as the identity of the client and time of beacon receipt, e.g. within a graphical user interface or in a command shell. Administrators can then investigate the problem and take manual steps to remedy it. Alternatively, the server 120 may attempt to automatically remove the malware, such as by attempting to remotely execute a malware removal program. In still another embodiment, the remediation module 530 sends alert emails, e.g. to the client 110 or to administrators of the enterprise, that note that the client 110 may be infected with malware. Other embodiments may employ any combination of these remedial actions.

Figure 6:
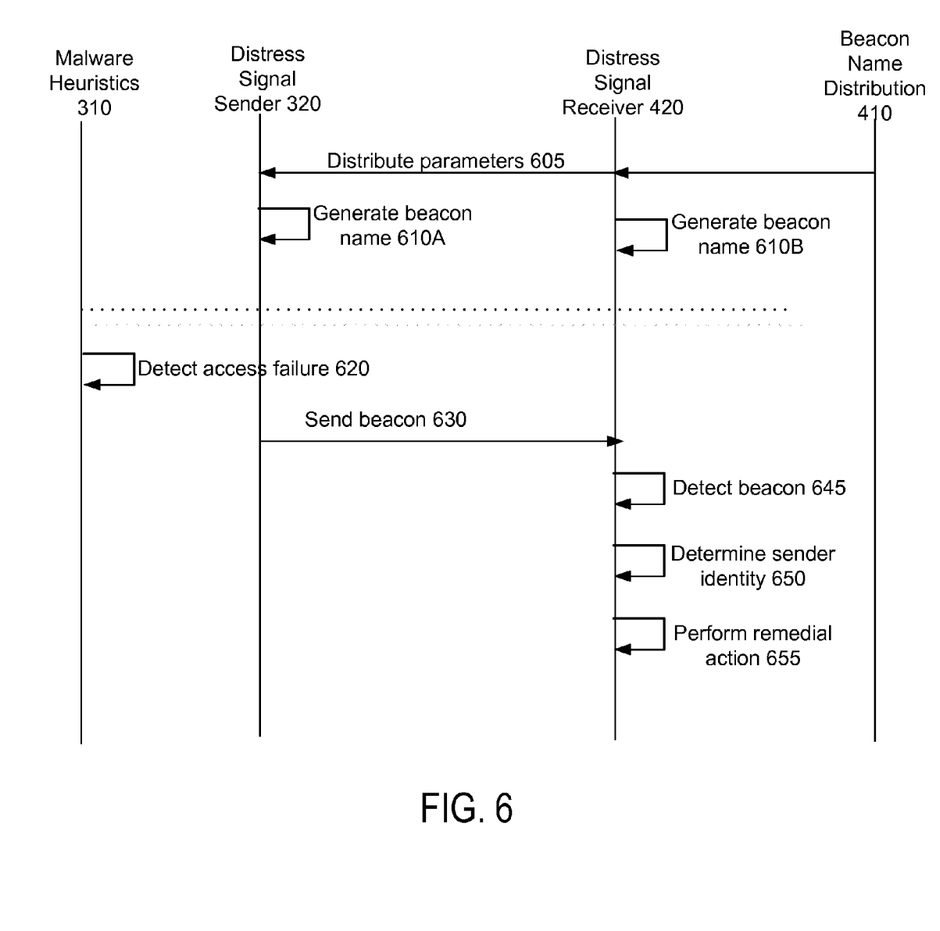
FIG. 6 depicts interactions that take place as part of beacon sending and detection, in accordance with one embodiment.

FIG. 6 depicts interactions that take place as part of beacon sending and detection, in accordance with one embodiment. Preliminarily, the beacon name distribution module 410 distributes the parameters—such as a seed value—for generating the beacon name to the distress signal senders 320 and receivers 420, as discussed above. The senders 320 and receivers 420 then store the parameters in their beacon name information repositories 305, 505 and generate 310 a first beacon name based on the parameters, which they then store in the information repositories. In one embodiment, the senders 320 and receivers 420 continue to generate new beacon names at given times in synchronization with each other; for example, in one embodiment they all generate new beacon names at the expiration of a given period of time, where the period of time can be made consistent by each sender and receiver synchronizing its system clock with a common timekeeper.

At some subsequent time, the malware heuristics module 310 of a client 110 of FIG. 1 detects 620 an unexpected failure to access a network resource, the failure indicating the possible presence of malware on the client 110. In response, the distress signal sender 320 constructs a beacon message including an identity of the client 110, such as an IP address, a machine name, or a MAC address. In one embodiment in which the beacon name includes a hostname (e.g., the hostname itself, or a URL containing it), the beacon message is a DNS request attempting to resolve the hostname and is addressed to a DNS server. In another embodiment in which the beacon name is an IP address, the beacon message is addressed directly to the IP address.

The distress signal receiver 420 detects 645 the beacon via the beacon detection module 510. As discussed above, the beacon detection module 510 can be implemented in different manners in different embodiments, such as a network traffic monitor on a network device, a DNS server plug-in, or a DNS log reader located on the DNS server or on any machine with permission to read the DNS server log. The distress signal receiver 420 then identifies 650 the sender by examining information in the beacon packet headers or in the body of the beacon message, and performs 655 an appropriate remedial action to address the possible existence of malware indicated by the beacon, such as logging the beacon message, sending alert messages such as emails to the client 110 or the server 120, or the like.

In some embodiments, the distress signal receiver 420 obtains information in addition to the identity of the sender. For example, in an embodiment in which the distress signal sender 320 places additional information, such as a list of URLs recently navigated, in the body of the beacon message, and the distress signal receiver 420 receives the entire beacon message directly, it may simply examine the body of the beacon message to obtain the additional information. For example, the distress signal receiver 420 receives the beacon message directly in embodiments in which it executes as a plug-in to a router or DNS server. In contrast, in embodiments in which the distress signal receiver 420 executes as, for example, a DNS failure log reader, the beacon packet is discarded by the DNS server prior to creation of a log entry, and so the distress signal receiver can only obtain the sender address from the DNS log.

As one alternative embodiment of special applicability in situations where the malware blocks all communications of the client 110, and not merely communications to well-known security servers 120, the absence of a beacon message from a client 110 is determined by the distress signal receiver 420 to indicate the presence of malware on the client 110. More specifically, the parameters are distributed 605 and beacon names generated 610 as above. Then, while the client 110 has access to communications, its distress signal sender module 320 sends a "heartbeat" beacon at regular intervals to the beacon name. The distress signal receiver 420 then detects 645 the beacon and identifies 650 the client 110 that sent it, noting that the client still has access to network communications. However, if the client 110 becomes infected with communications-blocking malware, then the heartbeat beacons from the client will be blocked and the distress signal receiver 420 will consequently not receive a beacon during the expected time interval. Thus, the distress signal receiver 420 will perform 655 a remedial action with respect to the client 110. Note that the fact that the beacon names are employed in this embodiment makes it difficult for malware to send its own simulated heartbeat beacons in order to prevent the infection from being discovered, since the malware will not know the current beacon name expected by the distress signal receiver 420.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of advertising presence of communications-blocking malware, comprising:
    receiving, at a client, beacon name-generation parameters;
    generating a beacon name based at least in part on the received parameters, the beacon name representing a network location;
    storing the beacon name;
    monitoring access to network communications available to the client;
    detecting, responsive to the monitoring, an inability of the client to access a predetermined network address of a security server while still being able to access other network addresses; and
    responsive to the detecting, sending a beacon message to the network location represented by the beacon name, the beacon message describing a security state of the client.

2. The computer-implemented method of claim 1, wherein the beacon message is sent to the network location represented by the beacon name periodically, the security state indicating that the client has an expected access to network communications.

3. The computer-implemented method of claim 1, further comprising:
    generating a second beacon name responsive to occurrence of a condition specified by the received parameters, the second beacon name representing a second network location; and
    sending a beacon message to the second network represented by the second beacon name.

4. The computer-implemented method of claim 1, wherein the generated beacon name comprises a hostname, and wherein the beacon message is a DNS query requesting an IP address for the hostname.

5. The computer-implemented method of claim 1, wherein the beacon message comprises an identifier of the client.

6. The computer-implemented method of claim 1, wherein the received parameters include a seed value, and wherein the beacon name is generated according to a pseudo-random algorithm that uses the seed value as input.

7. A non-transitory computer-readable storage medium storing a computer program executable by a processor for responding to a client indication of malware infection, actions of the computer program comprising:
    receiving beacon name-generation parameters;
    generating a beacon name based at least in part on the received parameters, the beacon name representing a network location;
    detecting a beacon message sent by a client device responsive to the client device determining that the client device is unable to access a predetermined network address of a security server but is able to access network addresses other than the address of the security server, the beacon message addressed to the network location represented by the beacon name and describing a security state of the client device; and
    responsive to receiving the beacon message, performing a remedial action.

8. The non-transitory computer-readable storage medium of claim 7, wherein detection of the beacon message comprises detecting a DNS server failure associated with an attempt to resolve the beacon name.

9. The non-transitory storage medium of claim 8, wherein detecting the DNS server failure comprises identifying a DNS server failure log entry associated with the beacon name.

10. The non-transitory storage medium of claim 7, wherein detection of the beacon message comprises monitoring network traffic for messages addressed to the beacon name.

11. The non-transitory computer-readable storage medium of claim 7, wherein the remedial action comprises sending a notification of malware infection of the client device to a security server.

12. A computer-implemented device for responding to a client indication of malware infection, comprising:
    a computer processor;
    a beacon name information repository;
    a distress signal receiver module that when executed by the computer processor performs actions comprising:
        receiving beacon name-generation parameters;
        generating a beacon name based at least in part on the received parameters, the beacon name representing a network location;
        storing the received parameters and the generated beacon name in the beacon name information repository;
        detecting a beacon message sent by a client device responsive to the client device determining that the client device is unable to access a predetermined network address of a security server but is able to access network addresses other than the address of the security server, the beacon message addressed to the network location represented by the beacon name and describing a security state of the client device; and
        responsive to receiving the beacon message, performing a remedial action.

13. The computer-implemented device of claim 12, wherein the beacon name-generation parameters are distributed to a plurality of devices located remotely from each other, the performed actions further comprising:
    generating a second beacon name responsive to occurrence of a condition specified by the received parameters, the second beacon name representing a second network location; and detecting a second beacon message sent by a client device and addressed to the second network location represented by the second beacon name.

14. The computer-implemented device of claim 12, wherein detection of the beacon message comprises detecting a DNS server failure associated with an attempt to resolve the beacon name.

15. The computer-implemented device of claim 14, wherein detecting the DNS server failure comprises identifying a DNS server failure log entry associated with the beacon name.

16. The computer-implemented device of claim 12, wherein detection of the beacon message comprises monitoring network traffic for messages addressed to the beacon name.

17. The computer-implemented device of claim 12, wherein the remedial action comprises sending a notification of malware infection of the client device to a security server.

* * * * *